March 1, 1966  C. A. PETERSON  3,237,981
WAGON END GATE LATCH
Filed Oct. 2, 1963
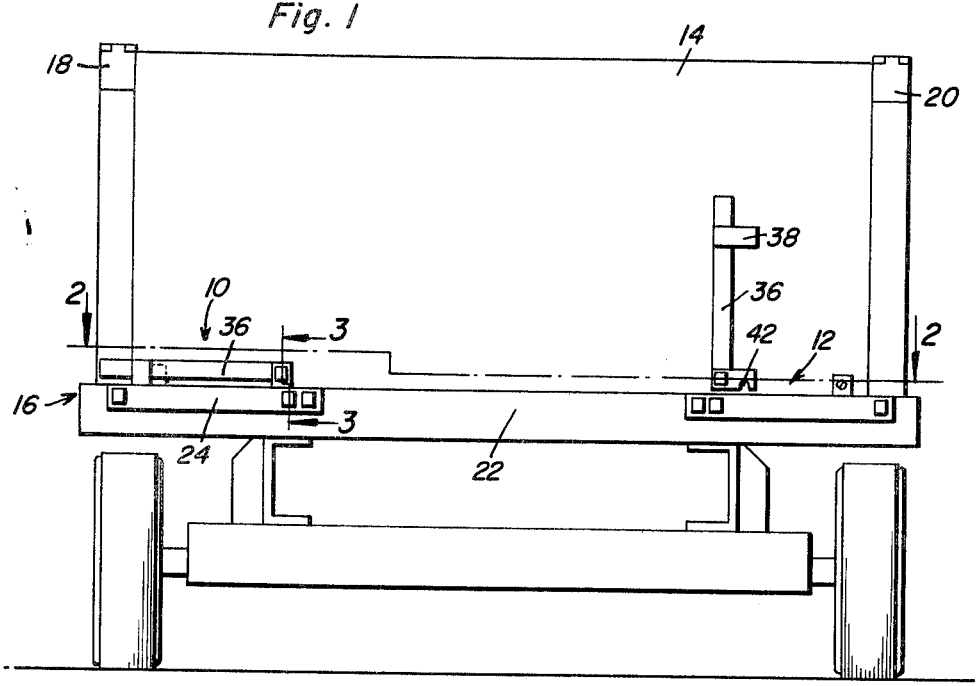
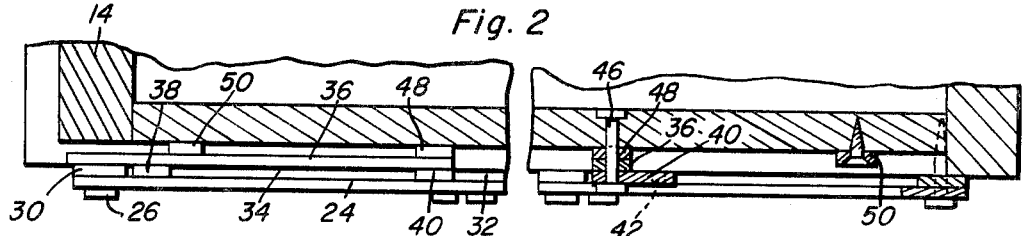
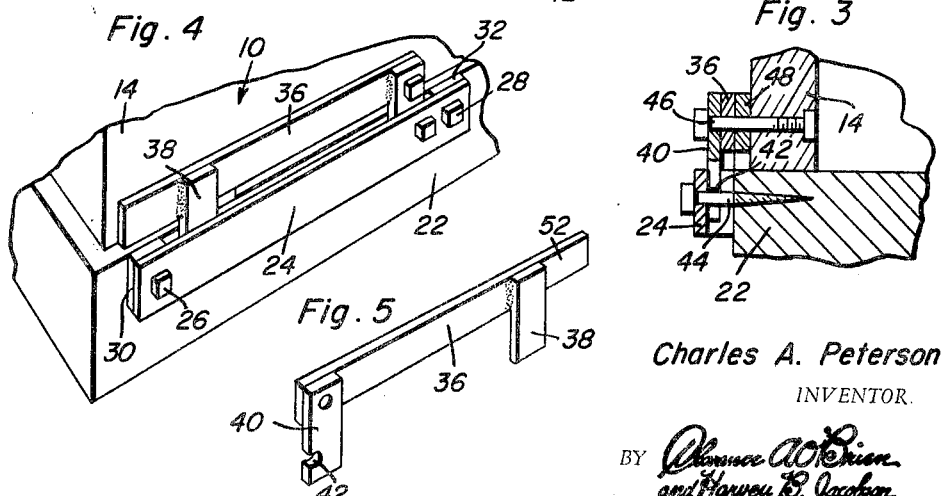
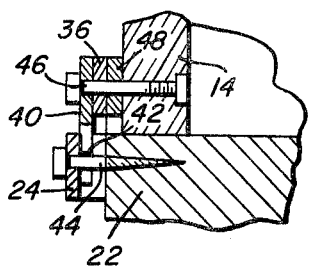
Charles A. Peterson
INVENTOR.

United States Patent Office 3,237,981
Patented Mar. 1, 1966

3,237,981
WAGON END GATE LATCH
Charles A. Peterson, R.F.D., Dayton, Iowa
Filed Oct. 2, 1963, Ser. No. 313,324
3 Claims. (Cl. 296—50)

This invention primarily relates to a locking mechanism for securing a pivotable end gate of a wagon to the wagon bed during transportation thereof.

Accordingly, it is the primary object of this invention to disclose a locking mechanism of the character indicated which is simple in construction and efficient in design and use and which specifically comprises an elongated bracket secured to and spaced from one end of the vehicle bed which provides a pocket for reception of an elongated lever element pivotally secured to the end gate which seats on a latch pin traversing the space between the bracket and vehicle bed.

A further object of this invention resides in providing the lever with a notch at one end thereof for seating on said latch pin and thereby connecting the pivotable end gate to the vehicle bed.

Yet another object of this invention resides in the inclusion of means mounted on the pivotable lever and on the end gate for frictionally holding the notch cut in said lever in seated engagement on the latch pin thereby preventing accidental disengagement of the lock and opening of the end gate.

Another object of this invention resides in the fact that the device is simple in construction and fabricated from a minimum number of components.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an end view in elevation of a wagon structure illustrating a pair of locking mechanism for locking the pivotable end gate of the wagon to the wagon bed and showing one of said locking mechanisms in locking position while the other one is shown open.

FIGURE 2 is a cross sectional view taken substantially along the plane indicated by the line 2—2 of FIGURE 1.

FIGURE 3 is a cross sectional view taken substantially along the plane indicated by the line 3—3 of FIGURE 1.

FIGURE 4 is an enlarged perspective view of one of the locking mechanisms comprising the subject matter of the instant invention.

FIGURE 5 is a perspective view of the lever comprising the main component of the locking mechanism.

Referring now to the drawing in detail, a pair of locking mechanisms generally designated by the numerals 10 and 12 are provided for locking an end gate 14 of a wagon structure 16 and pivotable about hinges 18 and 20 to the wagon bed 22 during transportation of material disposed on the bed. The locking mechanisms 10 and 12 are identical in construction, except for being right- and left-handed, and therefore a description of one will suffice for the purpose of illustrating the principles of the invention.

The locking mechanism 10 includes an elongated bracket of plate 24 secured by fasteners such as 26 and 28 to one side of the rear of the wagon bed 22. Blocks 30 and 32 are interdisposed between the opposite ends of plate or bracket 24 and the wagon bed 22 and space the plate 24 from the bed leaving an opening or pocket such as 34 therebetween. Pivotably mounted on the end gate 14 is an elongated lever 36. The lever 36 includes a pair of arms 38 and 40 secured to and depending from one side surface thereof. As shown in FIGURE 5, the arm 40 includes a semi-circular notch 42 cut in one edge thereof.

Traversing the pocket 34 formed between the end of the vehicle bed 22 and the bracket or plate 24 is a latch pin indicated by the numeral 44. The lever 36 is pivotably mounted upon the end gate 14 by means of a bolt such as 46 and is spaced from the end of the end gate by a spacing block such as 48 so that when the lever 36 is pivoted downwardly about the bolt 46, it will enter and be positioned within the pocket 34. When the lever is thus positioned, the notch 42 will be positioned in embracing relation with the latch pin 44 as shown in FIGURE 3 and the arms 38 and 40 will be disposed in the pocket 34 forwardly of the bracket 24 thus causing the end gate 14 to be secured in a closed position relative to the vehicle bed 22.

Means are also provided on the lever and end gate for frictionally holding the notch 42 in seated engagement on the latch pin thereby preventing accidental disengagement of the notch and the latch pin. Said means includes the arm 38 secured to the front surface of the lever 36 which is adapted to be placed in frictional contact with the inwardly facing surface of the plate or bracket 24. A second spacer block 50 is secured to the end of the end gate 14 and is adapted to frictionally engage the lever 36 when it is placed in position in the pocket 34 as shown in FIGURE 2. The frictional engagement of the spacer blocks 38 and 50 with the bracket 24 and lever 36, respectively, will frictionally hold the lever 36 in the pocket 34. The end of the lever 36 designated by the numeral 52 provides a handle element whereby upward pivotable motion may be imparted to the lever 36 to break the frictional engagement of the spacers 38 and 50, remove the arms 38 and 40 from within the pocket 34 and allow the opening of the end gate with respect to the vehicle bed.

It should thus be apparent that a locking mechanism for a pivotable end gate on a wagon vehicle has been disclosed wherein the opening of the end gate may be rapidly, efficiently and easily accomplished by merely pivoting a lever. Locking of the end gate is also easily and readily accomplished by reversing the movement of the lever. Not only do the spacer blocks 38 and 50 frictionally hold the lever in closed position but also provide effective guides during the movement of the lever for properly positioning it in the pocket 34. Also, due to the pocket 34 being open at both its upper and lower ends, dirt and grease will be prevented from accumulating within the pocket 34, which accumulation would act to retard free swinging motion of the lever.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed is as follows:

1. In combination with a vehicle having a load bed including a pivotal end gate whose free swinging edge portion, when said gate is closed, is disposed adjacent a stationary structural member of said load bed including a surface disposed in a plane closely adjacent and generally paralleling the plane in which the outer surface of said end gate is disposed, a locking mechanism for securing said end gate in the closed position, said locking mechanism comprising an elongated plate secured at its opposite ends to the first-mentioned surface with said elongated plate spaced outwardly from said surface and defining a pocket between the first-mentioned surface and the opposing surface of said plate disposed between its points of securement to the first-mentioned surface, an elongated locking lever pivotally secured at one end to the outer surface of said end gate for rotation about an axis extending transversely of the lever and disposed substantially normal to said plane and for movement of said lever between a position closely adjacent and generally paralleling said free swinging edge portion and a second position with the free end of said lever swung away from said free edge portion, the opposite end portions of said lever including laterally directed generally parallel arms receivable in said pocket when said lever is disposed in the first-mentioned position thereof, the arm adjacent the pivoted end of said lever including a notch formed therein opening away from the free swinging end of said lever, an abutment pin extending between said plate and said structural member across said pocket adjacent the pivoted end of said lever, said pin, when said lever is in the first-mentioned position thereof being abuttingly engaged by the free end portion of the notched arm with said pin embracingly received in said notch.

2. The combination of claim 1 wherein said lever, said plate and said end gate include coacting means frictionally engaged with each other when said lever is in the first-mentioned position for frictionally retaining said lever in said first-mentioned position.

3. The combination of claim 1 wherein said lever is swingable through a plane placed laterally of the plane containing said pocket and said arms are secured to said lever in laterally offset relation so as to be swingable with said lever in said plane in which said pocket is disposed.

References Cited by the Examiner

UNITED STATES PATENTS

| 859,141 | 7/1907 | Springer | 296—53 |
| 1,635,163 | 7/1927 | Allison | 296—50 |
| 1,742,764 | 1/1930 | Giltsch et al. | 292—204 X |
| 1,943,927 | 1/1934 | Phillips | 292—204 X |

FOREIGN PATENTS

| 18,028 | 1895 | Great Britain. |

BENJAMIN HERSH, *Primary Examiner.*

R. C. PODWILL, *Assistant Examiner.*